United States Patent

Crede et al.

[11] Patent Number: 6,104,773
[45] Date of Patent: Aug. 15, 2000

[54] FUEL ROD FOR A NUCLEAR REACTOR

[75] Inventors: Gerd-Dieter Crede, Kleinostheim; Rainer Schleich, Hanau, both of Germany

[73] Assignee: Siemens Aktiengesellschaft, Munich, Germany

[21] Appl. No.: 08/120,124

[22] Filed: Sep. 10, 1993

[30] Foreign Application Priority Data

Sep. 14, 1992 [EP] European Pat. Off. ............ 92115717

[51] Int. Cl.$^7$ ........................................... G21C 3/10
[52] U.S. Cl. ............................................. 376/451
[58] Field of Search ........................... 376/451, 261

[56] References Cited

U.S. PATENT DOCUMENTS

| | | | |
|---|---|---|---|
| 3,183,066 | 5/1965 | Lessmann et al. | 376/451 |
| 3,460,237 | 8/1969 | McClintock | 376/451 |
| 3,959,058 | 5/1976 | Rath et al. | 219/765 |
| 4,865,804 | 9/1989 | McGeary et al. | 376/451 |

FOREIGN PATENT DOCUMENTS

| | | |
|---|---|---|
| 344528 | 12/1989 | European Pat. Off. . |
| 1165988 | 6/1989 | Japan . |
| 2176598 | 7/1990 | Japan . |
| 1419838 | 12/1975 | United Kingdom . |

*Primary Examiner*—Daniel D. Wasil
*Attorney, Agent, or Firm*—Herbert L. Lerner; Laurence A. Greenberg

[57] ABSTRACT

A fuel rod for a nuclear reactor includes a metal cladding tube being filled with nuclear fuel and having ends, an outer surface, and a longitudinal axis. A metal seal plug is welded to one of the ends of the cladding tube at a transition point, defining an annular bead disposed on the outer surface of the cladding tube at the transition point. The annular bead has a cylindrical outer jacket surface extending substantially parallel to the longitudinal axis of the cladding tube. The annular bead has material being formed of the metal of the cladding tube and the metal of the seal plug. A welding apparatus for producing the fuel rod includes an electrode having a through bore formed therein for receiving one end of a cladding tube. A counter electrode is displaceable relative to the electrode for holding a seal plug to be welded to the one end of the cladding tube. The electrode has a cylindrical step formed therein at an end of the through bore facing toward the counter electrode. The cylindrical step has a diameter being greater than the diameter of the through bore.

6 Claims, 2 Drawing Sheets

FUEL ROD FOR A NUCLEAR REACTOR

BACKGROUND OF THE INVENTION

Field of the Invention

The invention relates to a fuel rod for a nuclear reactor, having a metal cladding tube being filled with nuclear fuel, a metal seal plug, locking plug or stopper being welded to one end of the tube and in particular being formed of the same metal, and an annular bead on the outer surface of the cladding tube at a transition point between the cladding tube and the seal plug. The invention also relates to a welding apparatus for producing the fuel rod.

Such a fuel rod is already typical and its annular bead has a sharp annular gradient. In other words, the cross section of the annular bead forms an acute triangle with an acute angle located at the annular gradient. Such a fuel rod can be produced in a welding apparatus with an electrode in which there is a bore for receiving one end of a cladding tube. The bore is chamfered, forming a frustoconical void that tapers toward the inside, on an end of the bore that faces toward a counter electrode which is displaceable relative to the aforementioned electrode and is intended to hold the seal plug. The frustoconical void determines the shape of the annular bead that forms from solidified welding melt when the seal plug is permanently welded to the cladding tube.

The welded connection between the cladding tube and the seal plug is considered perfect if the frustoconical void of the electrode for the cladding tube is filled to a predetermined extent during welding with material of the cladding tube and the seal plug, which is ascertainable by experimentation. After the welding, the quality of the weld can be determined by measuring the height of the gradient of the annular bead at the weld between the seal plug and the cladding tube of the fuel rod.

In order to produce nuclear reactor fuel assemblies that can be inserted into a nuclear reactor, the fuel rods must be threaded into a mesh of spacers, which as a rule are lattice-like. The annular bead at the weld between the cladding tube and the seal plug of the individual fuel rods is a hindrance to the threading operation. Therefore, after the quality of the weld has been measured and ascertained, the annular beads are mechanically machined down, for instance by being milled off, until it can be assumed that they will no longer hinder the threading of the fuel rods into the spacers.

In the mechanical machining down process, damage to the cladding tube can occur, causing a fuel rod to be rejected.

SUMMARY OF THE INVENTION

It is accordingly an object of the invention to provide a fuel rod for a nuclear reactor and a welding apparatus for producing the fuel rod, which overcome the hereinafore-mentioned disadvantages of the heretofore-known devices of this general type and which eliminate the operation of mechanical machining down.

With the foregoing and other objects in view there is provided, in accordance with the invention, a fuel rod for a nuclear reactor, comprising a metal cladding tube being filled with nuclear fuel and having ends, an outer surface, and a longitudinal axis; a metal seal plug being welded to one of the ends of the cladding tube at a transition point and in particular being formed of the same metal, defining an annular bead on the outer surface of the cladding tube at the transition point; the annular bead having a cylindrical outer jacket surface with jacket lines being substantially parallel to the longitudinal axis of the cladding tube; and the annular bead having material being formed of the metal of the cladding tube and the metal of the seal plug.

The outside diameter of the cylindrical jacket surface of the annular bead can be selected from the outset in such a way that threading the applicable fuel rod into cells of spacers without mechanical post-machining of the annular bead is possible. On the other hand, a conclusion as to the quality of the welded connection between the cladding tube and the seal plug of the applicable fuel rod can be drawn from the relative forward feed between the electrode having the cladding tube and the counter electrode having the seal plug as these parts are welded together.

In accordance with another feature of the invention, the annular bead has at least two humps on the cylindrical outer jacket surface, each extending along one of the jacket lines of the jacket surface.

In accordance with a further feature of the invention, the annular bead is resolidified from a welding melt.

In accordance with an added feature of the invention, the cylindrical outer jacket surface of the annular bead is mechanically unmachined or unworked.

In accordance with an additional feature of the invention, the cylindrical outer jacket surface of the annular bead has an encompassing depression formed therein in the annular bead containing the material of the cladding tube having the same microscopic structure as in the cladding tube.

With the objects of the invention in view, there is also provided a welding apparatus for producing a fuel rod, comprising an electrode having a through bore formed therein for receiving one end of a cladding tube; and a counter electrode being displaceable relative to the electrode for holding a seal plug to be welded the one end of the cladding tube; the electrode having a cylindrical step or shoulder formed therein at an end of the through bore facing toward the counter electrode, the cylindrical step having a diameter being greater than the diameter of the through bore. With such a welding apparatus, a fuel rod according to the invention can be manufactured simply and economically.

Other features which are considered as characteristic for the invention are set forth in the appended claims.

Although the invention is illustrated and described herein as embodied in a fuel rod for a nuclear reactor and a welding apparatus for producing the fuel rod, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
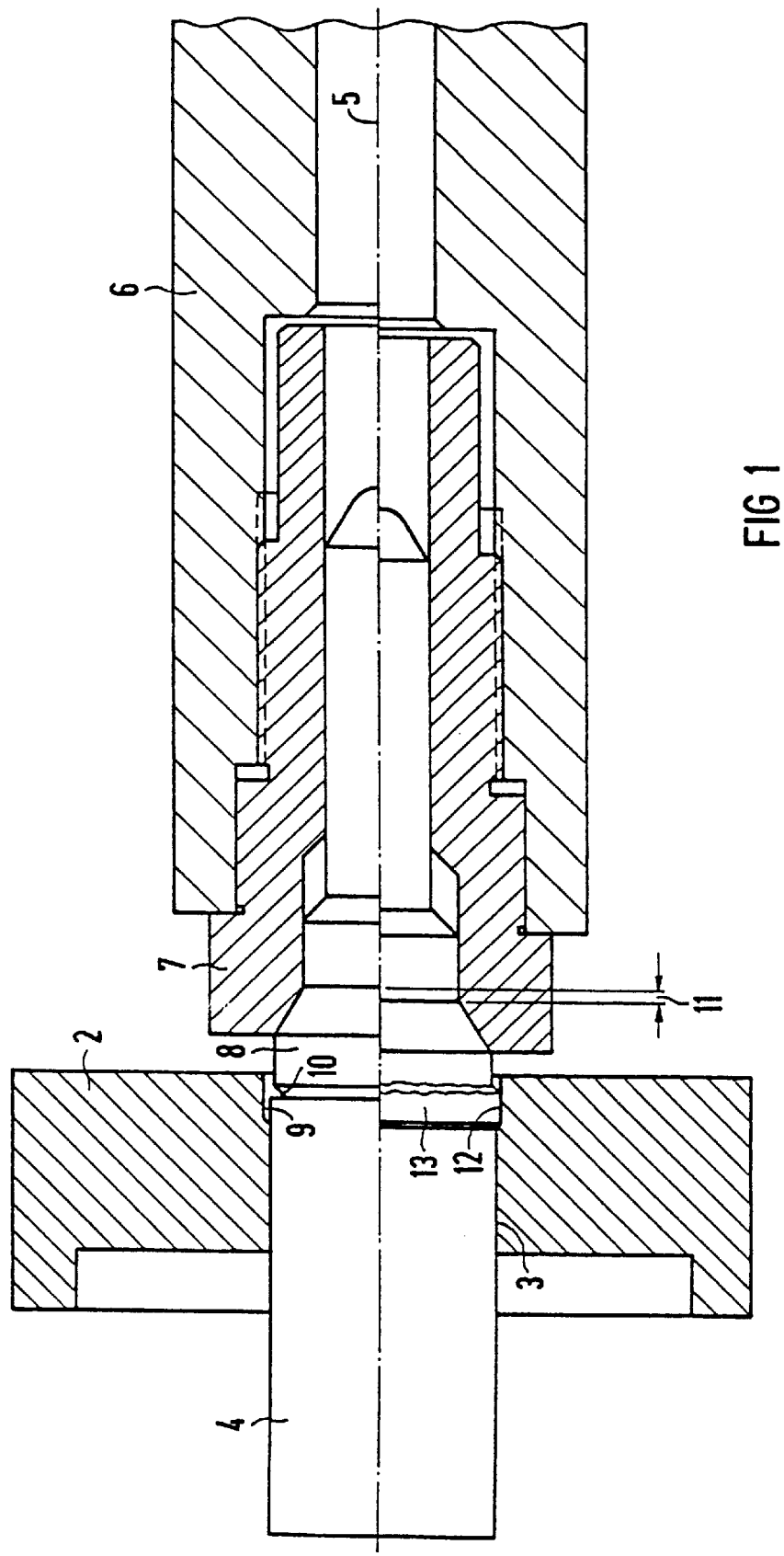
FIG. 1 is a fragmentary, diagrammatic, longitudinal-sectional view of a welding apparatus according to the invention for welding together a cladding tube and a seal plug of a fuel rod according to the invention.

Referring now to the figures of the drawing in detail and first, particularly, to FIG. 1 thereof, there is seen a welding apparatus having a copper electrode 2 which is assembled from two identical halves, with a through bore 3 in which a fuel rod cladding tube 4 being filled with nuclear fuel and made of a zirconium alloy is located. The two identically constructed parts of the copper electrode 2 surround the cladding tube 4 located in the through bore 3 and touch the outer surface of the cladding tube 4 over a large surface area.

A carrier body 6 for a counter electrode which is also provided, is displaceable relative to the copper electrode 2 in the direction of a longitudinal axis 5 of the cladding tube 4, and includes a copper sheath 7 disposed coaxially with the cladding tube 4 and therefore with the duct 3 in the copper electrode 2. A seal plug, locking plug or stopper 8 for the fuel rod, which is likewise formed of a zirconium alloy, is loosely inserted into the copper sheath 7.

The copper electrode 2 has a cylindrical step or shoulder 9 formed therein at an end of the through bore 3 facing toward the copper sheath 7. The cylindrical step 9 has a diameter which is greater than the diameter of the through bore 3. The step 9 forms a cylindrical void, into which the end of the cladding tube 4 protrudes from one end and into which the end of the seal plug 8 protrudes from the other end.

Figure 2:
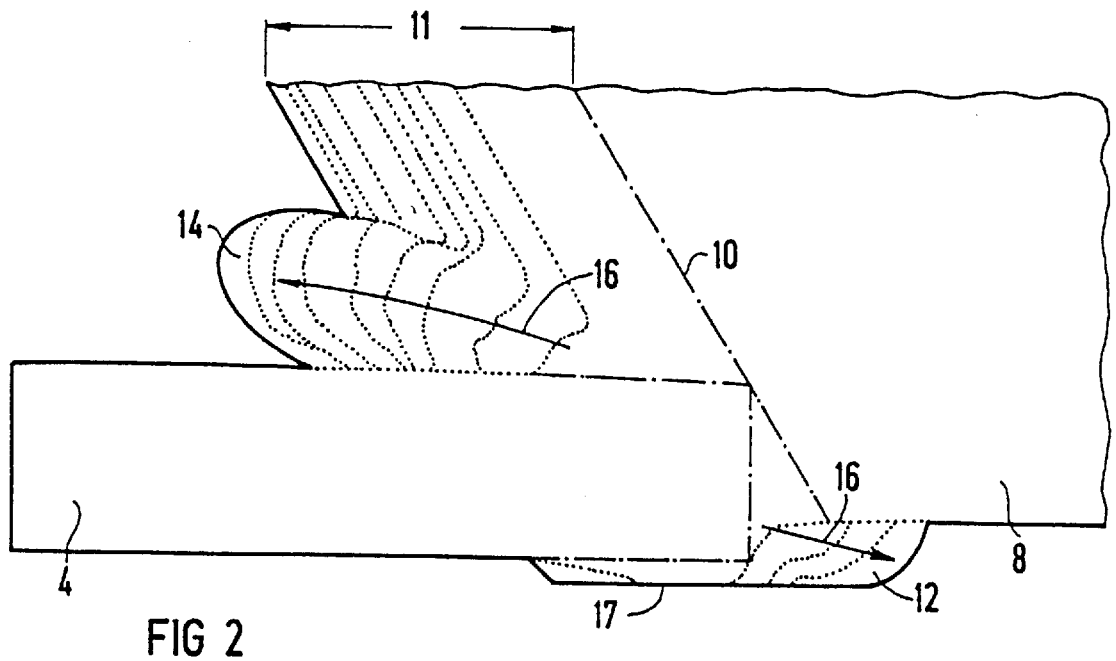
FIG. 2 is a fragmentary, longitudinal-sectional view of the seal plug of the fuel rod according to the invention, being welded to the cladding tube.

Dot-dash lines in FIG. 2 indicate the original shape of the cladding tube 4 and the seal plug 8. In its original shape, the seal plug 8 has an external cone 10 at an end surface, which tapers toward the longitudinal axis 5 of the cladding tube and therefore also toward the longitudinal axis of the seal plug 8, which coincides with the longitudinal axis 5. One end of the cladding tube 4 rests with its inner edge on the cone 10.

In order to weld the cladding tube 4 to the seal plug 8, an electrical current source is connected to the copper electrode 2 and to the copper sheath 7. At the same time, through the use of the carrier body 6, the seal plug 8 is pressed against the cladding tube 4, and the material at the point of contact between the seal plug 8 and the cladding tube 4 is upset by the amount of the forward feed 11 (upset distance).

In FIG. 1, the initial condition of the cladding tube 4 and seal plug 8 at the beginning of the welding process is shown above the longitudinal axis 5 of the cladding tube 4 shown in dot-dashed lines. Below this longitudinal axis 5, the final state can be seen, after completion of the welding process and disconnection of the copper electrode 2 and the copper sheath 7 from the current source.

As FIG. 1 shows, in this final state the seal plug 8 engages the cladding tube 4, and at a transition point between the cladding tube 4 and the seal plug 8, an annular bead 12 with a cylindrical outer jacket surface 13 is present on the outer surface of the cladding tube 4. FIG. 2 shows that an annular outwelling, outflow or squeezing out of material 14 is formed inside the cladding tube 4. Both the annular bead 12 and the outwelling of material 14 are formed of the material of the original cladding tube and the original seal plug, which in the present case is zirconium alloy.

Due to the two seams or joints that are located between the two parts of the copper electrode 2, there may be two humps 17 on the outer jacket surface 13 of the annular bead 12, each of which extends along a jacket line of the jacket surface 13.

Figure 3:
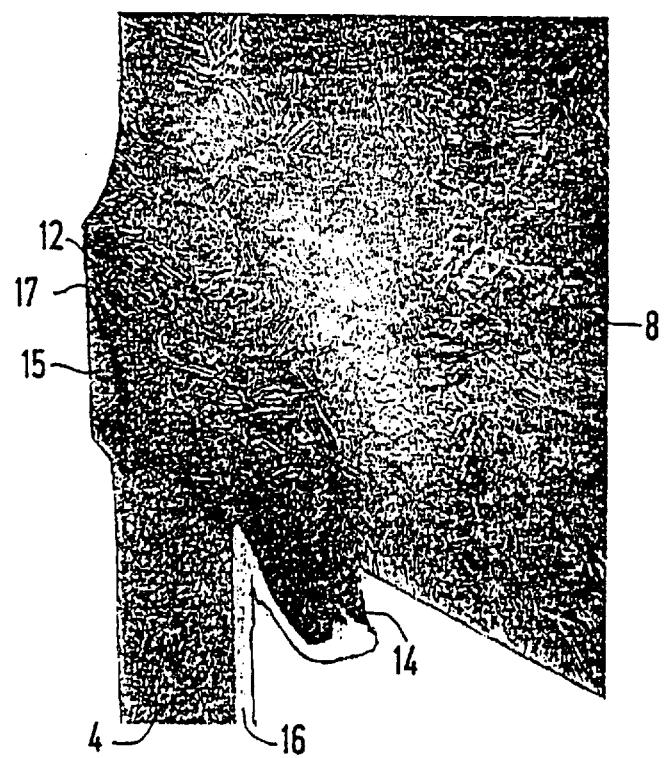
FIG. 3 is a micrograph of a polished section for the longitudinal section of FIG. 2.

The annular bead 12 as well as the outwelling of material 14 solidify again from a welding melt and have the microscopic structure shown in FIG. 3. The flow of the material caused by the welding is indicated by arrows 16.

As can be learned from FIG. 3, there is a depression 15 of the cladding tube 4, as seen in the encompassing direction relative to the longitudinal axis 5, which is located in the cylindrical jacket surface 13 of the annular bead 12. This depression 15 contains the material having the same microscopic structure as in the cladding tube 4, that is the zirconium alloy of the cladding tube 4.

On the inside of the cladding tube 4, an internal lining 18 of high-purity zirconium can be seen. This corrosion-sensitive lining continues on the surface of the outwelling of material 14 and is not part of the material solidified from the welding melt and thus has not penetrated as far as the outside.

The cylindrical outer jacket surface 13 of the annular bead 12 can remain mechanically unmachined. As a result, not only is there a savings in production costs, but damage to the cladding tube 4 at the annular bead 12 is also avoided. Moreover, machining chips, which in the case of a zirconium alloy could even self-ignite very easily, are avoided.

What is claimed is:

1. A fuel rod for a nuclear reactor, comprising:

a metal cladding tube filled with nuclear fuel and having ends, an outer surface, and a longitudinal axis;

a metal seal plug welded to one of the ends of said cladding tube at a transition point, and an annular bead disposed on the outer surface of said cladding tube at the transition point;

said annular bead having a cylindrical outer jacket surface extending substantially parallel to the longitudinal axis of said cladding tube; and said annular bead being formed of a material formed of the metal of said cladding tube and the metal of said seal plug.

2. The fuel rod according to claim 1, wherein said seal plug and said cladding tube are formed of the same metal.

3. The fuel rod according to claim 1, wherein said annular bead has at least two humps on said cylindrical outer jacket surface, each extending along said jacket surface substantially parallel to the longitudinal axis.

4. The fuel rod according to claim 1, wherein said annular bead is resolidified from a welding melt.

5. The fuel rod according to claim 1, wherein said cylindrical outer jacket surface of said annular bead is mechanically unmachined.

6. The fuel rod according to claim 1, wherein said cylindrical outer jacket surface of said annular bead has an encompassing depression formed therein in said annular bead containing the material of said cladding tube having the same microscopic structure as in said cladding tube.

* * * * *